(12) United States Patent
Beaverson et al.

(10) Patent No.: US 10,176,117 B2
(45) Date of Patent: Jan. 8, 2019

(54) EFFICIENT METADATA IN A STORAGE SYSTEM

(71) Applicant: CACHEIO LLC, Littleton, MA (US)

(72) Inventors: Arthur James Beaverson, Boxborough, MA (US); Bang Chang, Cary, NC (US)

(73) Assignee: Cacheio LLC, Littleton, MA (US)

( * ) Notice: Subject to any disclaimer, the term of this patent is extended or adjusted under 35 U.S.C. 154(b) by 0 days.

(21) Appl. No.: 15/516,265

(22) PCT Filed: Sep. 30, 2015

(86) PCT No.: PCT/US2015/053226
§ 371 (c)(1),
(2) Date: Mar. 31, 2017

(87) PCT Pub. No.: WO2016/054212
PCT Pub. Date: Apr. 7, 2016

(65) Prior Publication Data
US 2017/0300424 A1  Oct. 19, 2017

Related U.S. Application Data

(60) Provisional application No. 62/058,328, filed on Oct. 1, 2014.

(51) Int. Cl.
| | |
|---|---|
| *G06F 3/06* | (2006.01) |
| *G06F 12/00* | (2006.01) |
| *G06F 12/109* | (2016.01) |
| *G06F 17/30* | (2006.01) |
| *G06F 12/02* | (2006.01) |

(52) U.S. Cl.
CPC ............ *G06F 12/109* (2013.01); *G06F 3/064* (2013.01); *G06F 3/0604* (2013.01); *G06F 3/0608* (2013.01); *G06F 3/0641* (2013.01); *G06F 3/0647* (2013.01); *G06F 3/0664* (2013.01); *G06F 3/0685* (2013.01); *G06F 3/0689* (2013.01); *G06F 12/0246* (2013.01); *G06F 17/30159* (2013.01)

(58) Field of Classification Search
None
See application file for complete search history.

(56) References Cited

U.S. PATENT DOCUMENTS 7,454,592 B1 * 11/2008 Shah .................... G06F 11/1453
  711/216
9,141,554 B1 *  9/2015 Candelaria .......... G06F 12/0864
(Continued)

*Primary Examiner* — Kaushikkumar M Patel
(74) *Attorney, Agent, or Firm* — Rimon P.C.

(57) ABSTRACT

A method for managing metadata in a storage system is disclosed. The system includes a processor, a storage medium, a first metadata table that maps every data block's LBN to its unique content ID, and a second metadata table that maps every content ID to its PBN on the storage medium. During a data movement process, the processor is configured to determine the content ID of the data block and update its entry in the second metadata table without accessing the first metadata table. A method is also disclosed to reduce the size of the first metadata table. Only content ID is stored in the first metadata table and its LBN is determined by the metadata entry's relative position in the table. Metadata entries are stored in metadata blocks and deduplicated.

17 Claims, 9 Drawing Sheets

(56) References Cited

U.S. PATENT DOCUMENTS

| | | | | |
|---|---|---|---|---|
| 2010/0094817 A1* | 4/2010 | Ben-Shaul | ............ | G06F 3/0608 707/697 |
| 2011/0113281 A1* | 5/2011 | Zhang | ................. | G06F 11/1068 714/6.12 |
| 2011/0258374 A1* | 10/2011 | Pertocelli | .............. | G06F 3/0608 711/104 |
| 2012/0260021 A1* | 10/2012 | Rudelic | ................. | G06F 3/0641 711/103 |
| 2014/0160591 A1* | 6/2014 | Sakamoto | .......... | G11B 20/1816 360/53 |
| 2014/0229655 A1* | 8/2014 | Goss | ................... | G06F 12/0246 711/103 |
| 2015/0244795 A1* | 8/2015 | Cantwell | .......... | G06F 17/30575 709/202 |
| 2016/0357477 A1* | 12/2016 | Nakajima | ............. | G06F 3/0641 |

* cited by examiner

EFFICIENT METADATA IN A STORAGE SYSTEM

RELATED APPLICATIONS

The present application is the US national phase application of PCT/US2015/053226, which is titled Efficient Metadata in a Storage System, filed on Sep. 30, 2015, and claims priority to U.S. Provisional Application No. 62/058,328 filed on Oct. 1, 2014.

TECHNICAL FIELD

The present disclosure relates generally to storage systems, and, more specifically, to managing metadata in a storage system.

BACKGROUND

A storage system comprises a persistent storage medium and a storage processor running storage software applications. The storage medium may be hard disk drives (HDDs), solid-state devices (SSDs), a combination of HDDs and SSDs (Hybrid), or storage devices using another storage technology. The storage medium may include a RAID (Redundant Array of Inexpensive Disks) hardware or software for data redundancy and load balancing. The storage medium may also include a NVRAM device for deferred writes. The storage processor may be dedicated to running storage software applications or shared between storage software applications and user applications. Storage software applications, such as a logical volume manager or a filesystem, provide storage virtualization, data services, and data mobility.

Storage virtualization decouples the logical storage space addressed by user applications from the physical data placement on the persistent storage medium. Storage virtualization allows the storage processor to optimize physical data placement based on the characteristics of the storage medium and provide value added data services such as deduplication and snapshot. To support storage virtualization, the storage processor translates user Input/Output (I/O) requests addressed in logical block numbers (LBNs) to another set of I/O requests addressed in physical block numbers (PBNs) to the storage medium. In order to perform this translation the storage processor maintains a forward map table of metadata entries, each of which maps a data block's LBN to its PBN on the storage medium. To support data deduplication the storage processor maintains a deduplication table of metadata entries, each of which maps a data block's fingerprint (a hash of the block's contents) to its PBN on the storage medium. Additional metadata may be maintained in support of other data services such as compression and snapshot.

A data block is the smallest storage unit that the storage processor manages via the metadata tables. The size of the data block can be as small as 4 KB or as large as an entire volume. There are advantages in employing small data block sizes in order to optimize data placement and increase deduplication ratio. The size of the forward map table is determined by the data block size and the usable capacity of the storage system. On a small capacity storage system with a large data block size, the entire metadata tables may be small enough to be stored in DRAM for fast access. However metadata tables are becoming increasingly bigger driven by larger physical capacity and smaller data block sizes. Data services such as deduplication, compression, and snapshot also increase the metadata table size by many folds by increasing the usable capacity of the system. In the case where the DRAM is not large enough to store the entire metadata table, the metadata table is stored on the storage medium, with a portion of it cached in the DRAM. Caching is only effective when metadata access has locality of reference—real world user applications tend to access related logical storage addresses frequently. User application locality of reference allows the storage processor to cache frequently accessed metadata entries in the DRAM without significant loss of performance. Without user application locality of reference, caching simply devolves into thrashing, which exhausts system resources and slows down performance.

Data mobility is becoming increasingly important in modern storage systems. One example of data mobility is garbage collection, which moves user data from a first partially filled segment to another on a solid state storage medium until the entire first segment contains no more user data and can be reused for new sequential writes. Another example is load balancing after capacity expansion or component failures. Load balancing moves user data from their current physical locations to new locations in order to redistribute user data and their access across all available capacity and bandwidth. Data mobility is expected to be transparent to user applications—change in a data block's physical location should not affect its LBN addressed by user applications. To support transparent data mobility, the storage processor maintains a reverse map metadata table that maps every physical data block's PBN to one or more LBNs. As part of moving a data block from PBN1 to PBN2, the storage processor first uses PBN1 to identify the physical block's entry in the reverse map table and the block's one or more LBNs. It then uses these LBNs to identify the block's entries in the forward map table and update these entries to map to PBN2. The storage processor then updates the reverse map table to delete the entry for PBN1 and add an entry for PBN2. It then needs to calculate the data block's fingerprint and update the fingerprint's entry in the deduplication table so it maps to PBN2. Given that data mobility does not benefit from user application locality of reference, these numerous accesses to multiple metadata tables cannot be effectively cached in the DRAM, causing the system to thrash.

In view of the above, there is a need for more efficient metadata management in support of storage virtualization, data services, and data mobility.

SUMMARY

Methods and apparatus for managing metadata in a storage system are disclosed.

A storage system is configured to support storage virtualization, data services, and data mobility. The storage system comprises a processor, a persistent storage medium, a memory, a first metadata table, and a second metadata table. The first metadata table maps each data block's LBN to its unique content ID. The second metadata table maps every content ID to its PBN on the storage medium. The storage processor is configured to perform a data movement process by determining the content ID of the data block and updating the content ID's entry in the second metadata table. The processor can determine the content ID by either computing a strong hash of the block's contents or reading the content ID stored with the data block. Data blocks are deduplicated due to the unique content ID. In some embodiments the first metadata table is stored on the storage medium and cached in the memory based on locality of reference. In some embodiments the second metadata table is stored entirely in the memory for fast access. In some embodiments the first metadata table entry only includes the data block's content ID. LBN is not stored but can be determined based on its metadata entry's relative position in the first metadata table. In some embodiments entries in the first metadata table are stored in metadata blocks. A unique content ID is generated for each metadata block and metadata blocks are deduplicated.

Of course, the present invention is not limited to the features, advantages, and contexts summarized above, and those familiar with storage technologies will recognize additional features and advantages upon reading the following detailed description and upon viewing the accompanying drawings.

DETAILED DESCRIPTION

Methods for managing metadata in a storage system are disclosed to more effectively support storage virtualization, data services, and data mobility.

Figure 1:
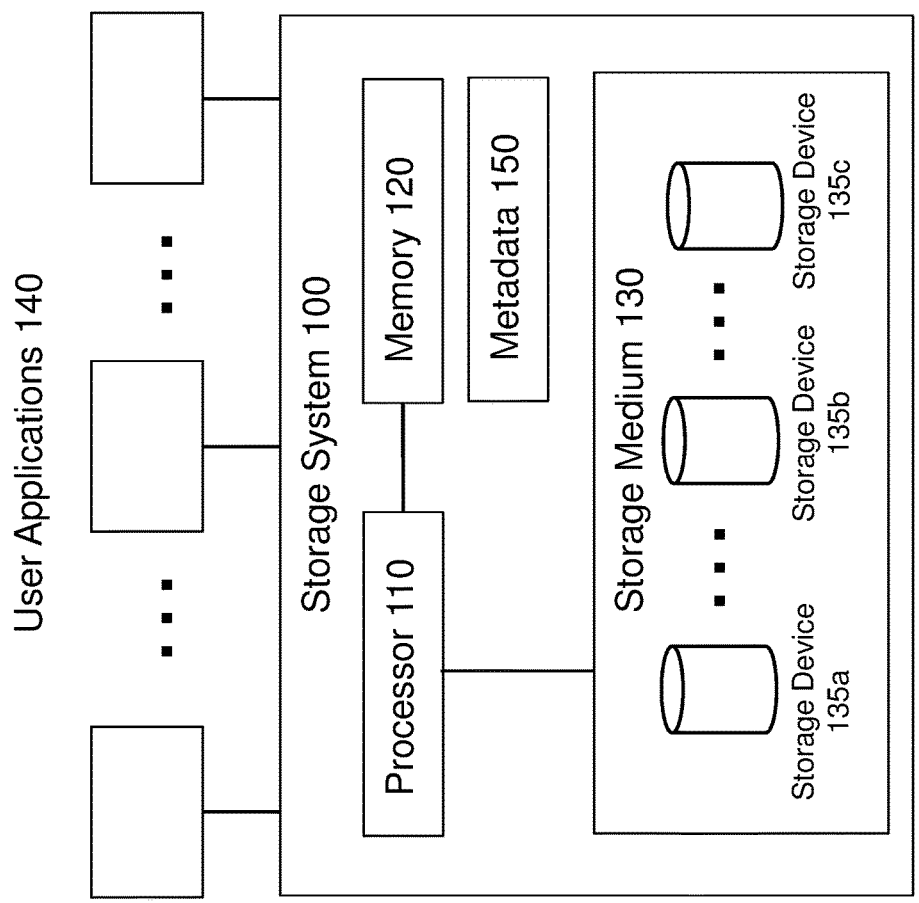
FIG. 1 illustrates a block diagram of a storage system.

FIG. 1 illustrates one embodiment of a storage system 100 that includes a processor 110, a memory 120, and a persistent storage medium 130. The storage medium 130 may comprise a plurality of storage devices 135a-135c. Examples of storage device include solid-state device (SSD), hard disk drive (HDD), and a combination of SSDs and HDDs (Hybrid). The storage medium may include a RAID (Redundant Array of Inexpensive Disks) system across the storage devices 135a-135c for data redundancy and load balancing. Examples of RAID system include software RAID, hardware RAID card, RAID on a chip, Erasure Coding, or JBOD (Just a Bunch of Disks). The storage medium 130 may also include a NVRAM device for write caching and deferred writes. Examples of NVRAM device include NVRAM card, battery-backed DRAM, and NVDIMM. The storage system 100 provides persistent storage to one or more user applications 140. In some embodiments, there may be multiple storage systems 100 implemented as a cluster for redundancy and performance. In some embodiments the storage medium 130 may be accessible by multiple storage systems 100 as shared storage medium. In some embodiments the application 140 and the storage system 100 may be running on the same physical system. In other embodiments the application 140 may access the storage system through a storage network such as FibreChannel, Ethernet, InfiniBand, and PCIe.

The processor 110 interfaces between the application 140 and the storage medium 130. The processor 110 controls and manages the storage medium 130. For example, the processor 110 may provide a set of commands for the application 140 to read from and write to the storage medium 130. Also the processor 110 can run storage software applications to provide storage virtualization, data services, and data mobility that often can't be achieved by the storage medium 130.

In the present disclosure the storage system 100 includes one or more metadata tables 150. The metadata 150 may be stored entirely in the memory 120 or stored on the storage medium 130 and cached in the memory 120. In some embodiments the metadata 150 includes a forward map table of entries, each of which maps a data block's LBN addressed by the application 140 to its PBN on the storage medium 130. To support storage virtualization the processor 110 utilizes the forward map table to translate user I/O requests from the application 140 addressed in LBNs to another set of physical I/O requests addressed in PBNs to the storage medium 130. In some embodiments the metadata 150 also includes a reverse map table of entries, each of which maps a data block's PBN on the storage medium 130 to one or more LBNs addressed by the application 140. To support transparent data mobility the processor 110 utilizes the reverse map table to identify a data block's LBNs based on its PBN before updating the forward map table based on the LBNs. In the case where the memory 120 is not large enough to store the entire metadata 150, these numerous access to the reverse map table and forward map table causes the processor 110 to thrash—page in and out metadata entries constantly and slow down performance. Caching is not effective in this case as data mobility does not benefit from user application locality of reference.

Figure 2:
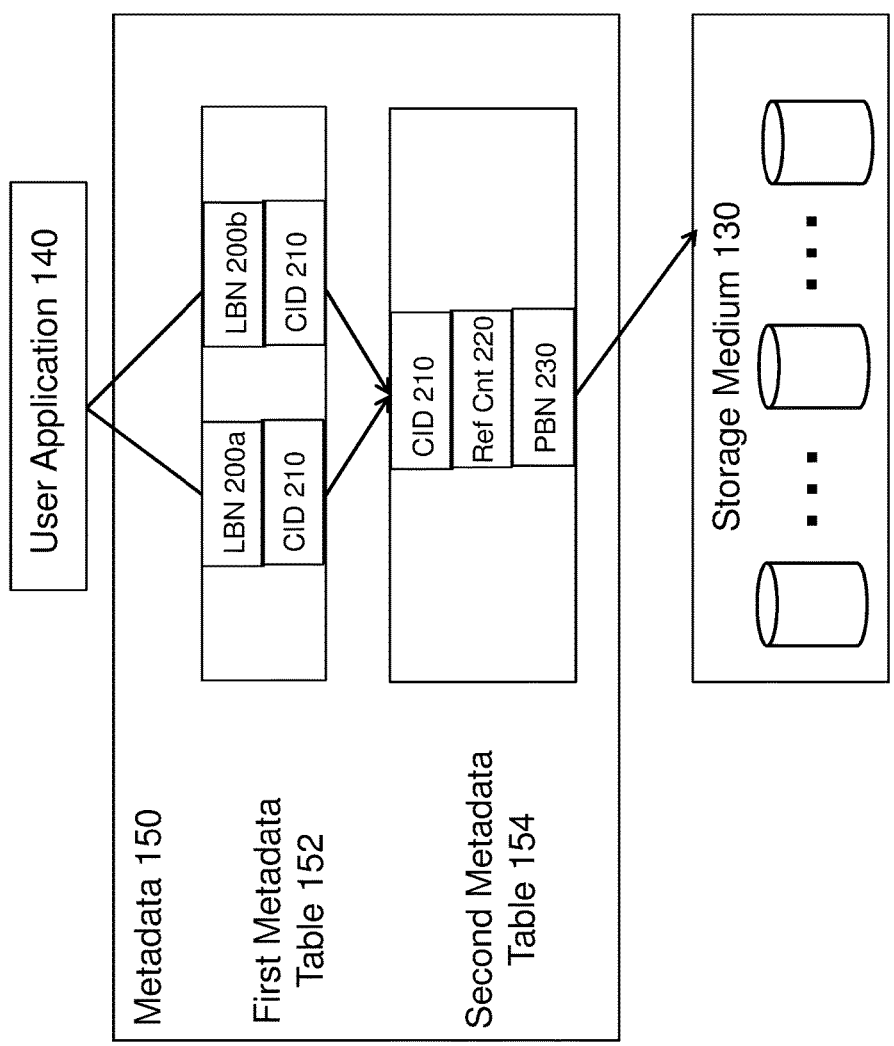
FIG. 2 illustrates a block diagram of metadata tables.

The present disclosure provides methods for managing the metadata 150 as illustrated in FIG. 2. The metadata table 150 comprises a first metadata table 152 and a second metadata table 154. The first metadata table 152 comprises a plurality of entries, each of which maps a logical data block's LBN 200a to its unique content ID (CID 210). The content ID is unique to the data block's contents—the likelihood that two distinct blocks will have the same content ID is vanishingly small. In some embodiments a strong hash function, such as Sha1 developed by the US National Institute for Standards and Technology (NIST), is used to compute a block's content ID and make it computationally infeasible that two distinct blocks will have the same content ID. The second metadata table 154 comprises a plurality of entries, each of which maps a block's CID 210 to its PBN 230 on the storage medium 130. In the case where two logical blocks LBN 200a and LBN 200b have duplicate contents, both LBNs are mapped to the same CID 210 and consequently PBN 230. The reference count 220 is maintained to reflect the number of different LBNs that are mapped to the CID 210 and its PBN 230. Data deduplication is therefore supported without a separate deduplication metadata table. At a fixed block size, the size of the first metadata table 152 is proportional to the usable capacity of the storage system whereas the size of the second metadata table 154 is proportional to the system's physical capacity. In some embodiments the usable capacity of the system is many times larger than its physical capacity due to data deduplication, compression, and snapshots, rendering the first metadata table 152 to be many times bigger than the second metadata table 154.

Figure 3:
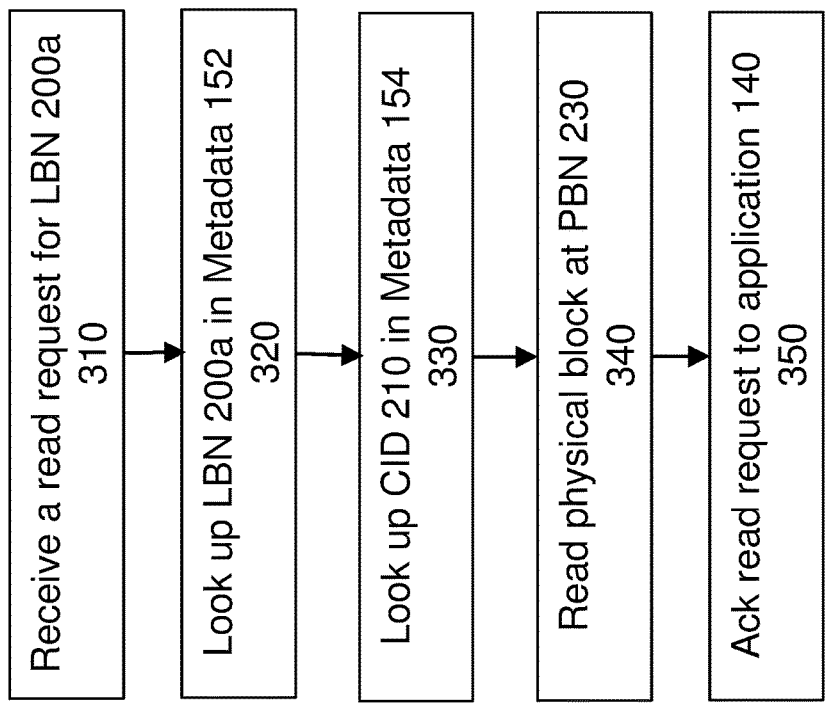
FIG. 3 illustrates a flow diagram of servicing a read request.

FIG. 3 illustrates a flow diagram for servicing a read request from the application 140:

Step 310: The processor 110 receives a read request for LBN 200a;

Step 320: The processor 110 looks up LBN 200a in the first metadata table 152 to identify its CID 210;

Step 330: The processor 110 looks up CID 210 in the second metadata table 154 to identify its PBN 230;

Step 340: The processor 110 reads the physical block at PBN 230;

Step 350: The processor 110 acknowledges the completion of the read request to the application 140.

In some embodiments the storage processor 110 is configured to compute the content ID of the physical block at PBN 230 and compares that to the CID 210 in the metadata entry. If the two content IDs match the storage processor can be confident that the storage medium has returned the original data.

Figure 4:
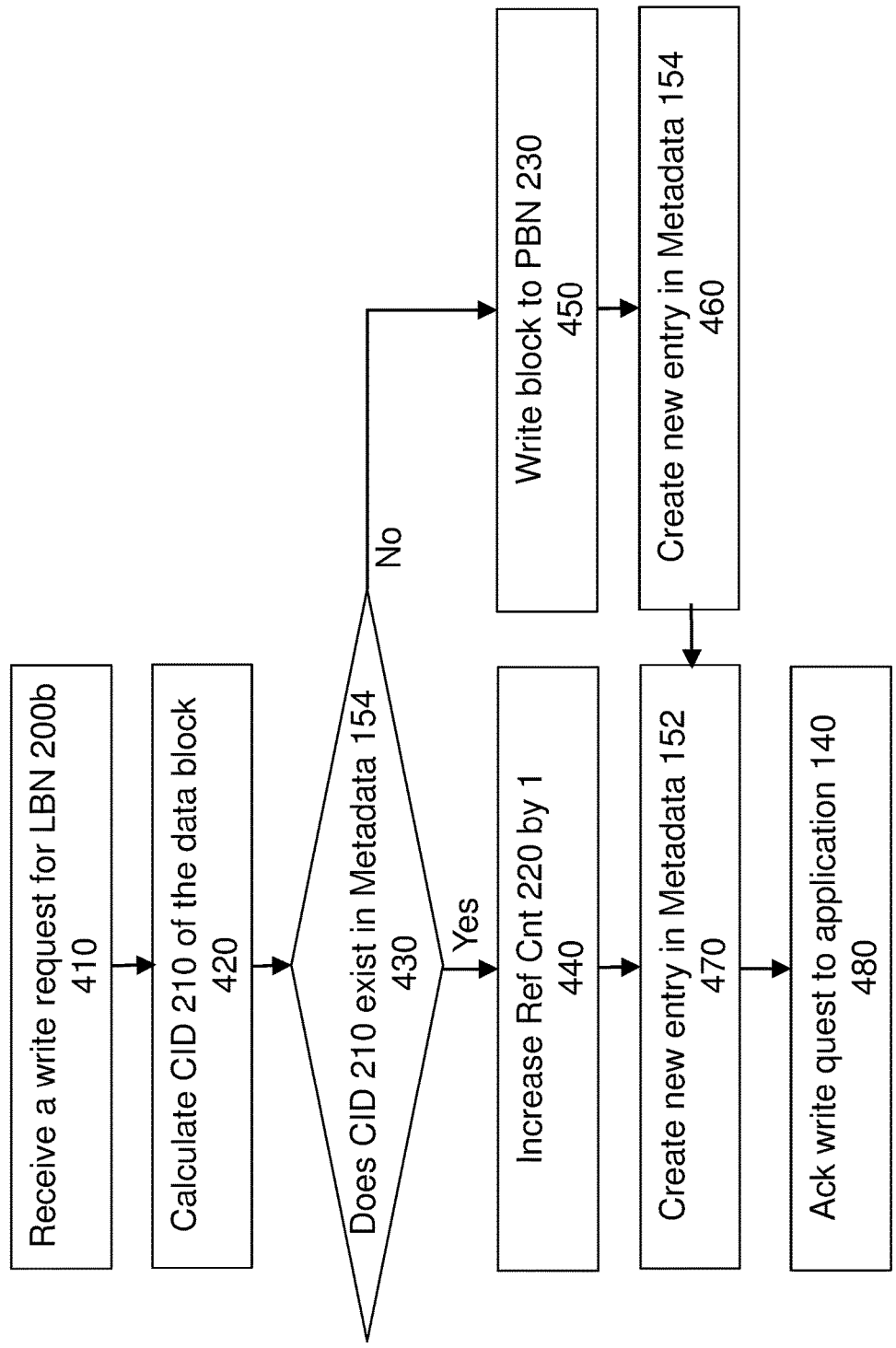
FIG. 4 illustrates a flow diagram of servicing a write request.

FIG. 4 illustrates a flow diagram for servicing a write request from the application 140:

Step 410: The storage processor 110 receives a write request for LBN 200b;

Step 420: The storage processor 110 calculates CID 210 of the write data block;

Step 430: The storage processor 110 looks up CID 210 in the second metadata table 154;

Step 440: If CID 210 already exists in the metadata table 154, its corresponding reference count 220 is increased by 1;

Step 450: If CID 210 does not exist in the metadata table 154, the storage processor 110 writes the data block to a new physical location PBN 230;

Step 460: The storage processor 110 creates a new entry for CID 210 and PBN 230 in the second metadata table 154 and sets its reference count to 1;

Step 470: The storage processor 110 creates a new entry for LBN 200b and CID 210 in the first metadata table 152;

Step 480: The storage processor 110 acknowledges the completion of the write request to the application 140.

In some embodiments the storage processor 110 writes the data block to a NVRAM device at step 450 and acknowledges write completion to the application 140 at step 480 before writing the data block to a new physical location on the storage medium 130 at a later time (deferred write).

As part of servicing a read or write request, access to the first metadata table 152 using LBN 200a and 200b benefits from user application locality of reference. In some embodiments the first metadata table is stored on the storage medium 130 and cached in the memory 120 based on locality of reference. Access to the second metadata table 154 using CID 210 does not benefit from locality of reference and therefore cannot be cached effectively. In some embodiments the second metadata table 154 is many times smaller than the first metadata table 152 and is stored entirely in the memory 120.

Figure 5:
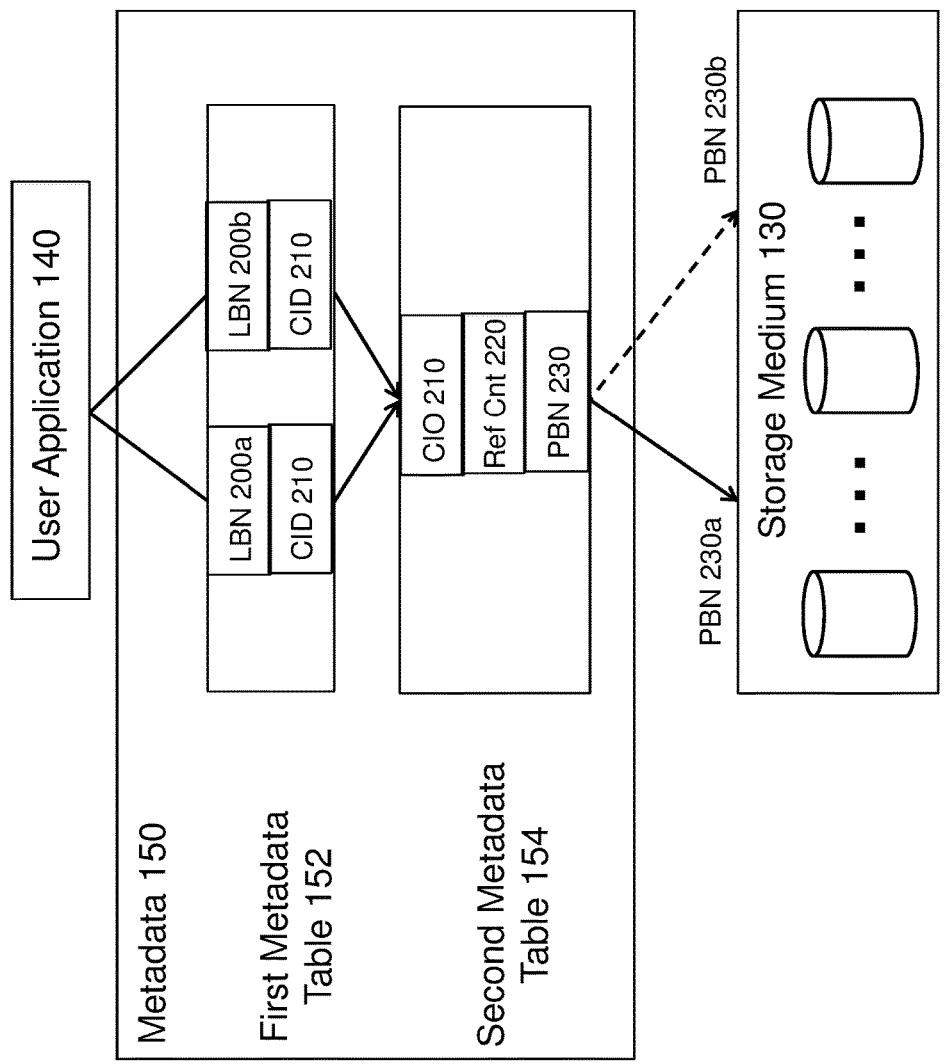
FIG. 5 illustrates a block diagram for transparent data mobility.
Figure 6:
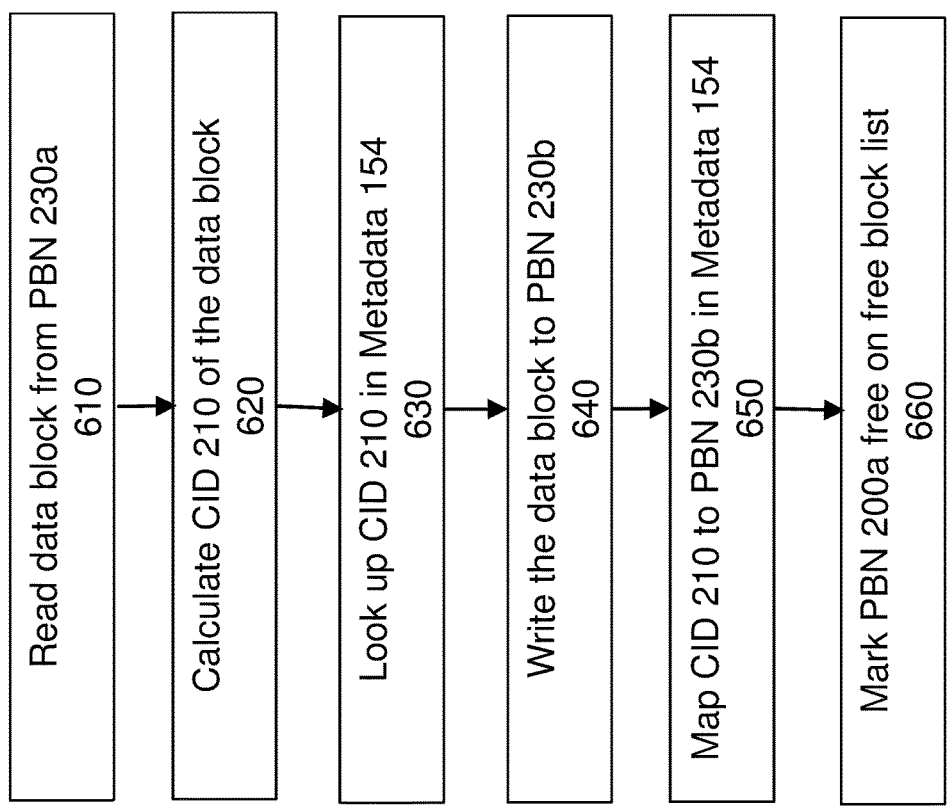
FIG. 6 illustrates a flow diagram of a data movement process.

FIG. 5 illustrates a block diagram for transparent data mobility, which requires moving the physical data block from PBN 230a to PBN 230b without affecting the application 140's access to logical block addresses LBN 200a and LBN 200b. FIG. 6 illustrates a flow diagram for this data movement process:

Step 610: The storage processor 110 reads the physical data block at PBN 230a;

Step 620: The storage processor 110 calculates the CID 210 of the data block;

Step 630: The storage processor 110 looks up CID 210 in the second metadata table 154;

Step 640: The storage processor 110 writes the data block to the new physical location PBN 230b;

Step 650: The storage processor 110 maps CID 210 to PBN 230b in the second metadata table 154;

Step 660: The storage processor 110 marks PBN 230a free on the free block list.

Figure 7:
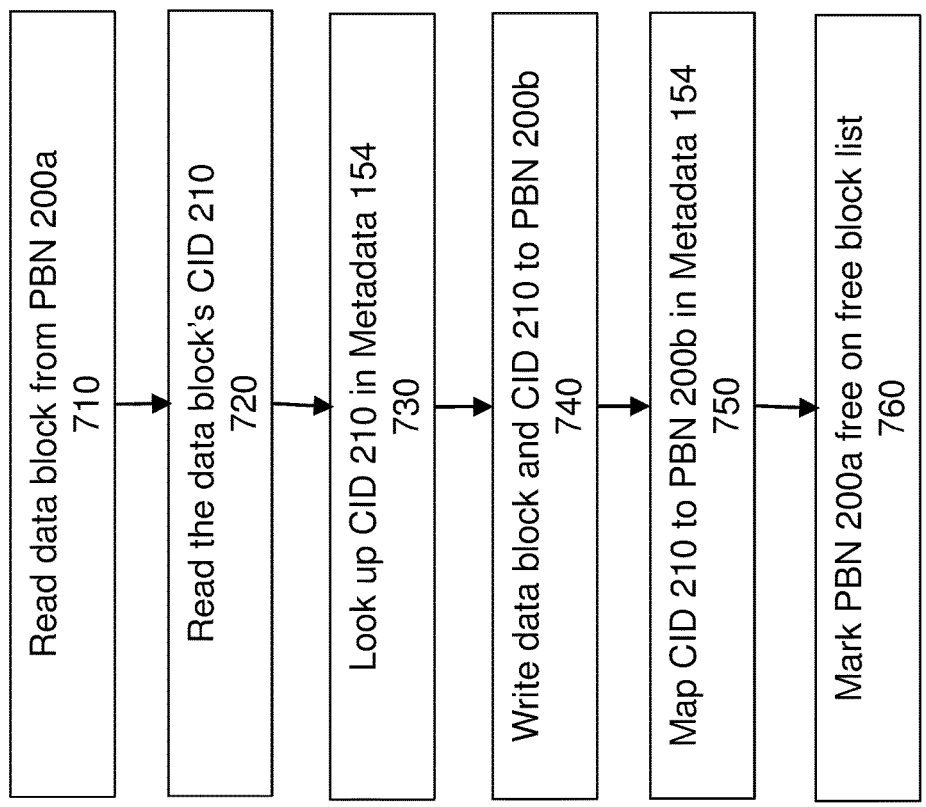
FIG. 7 illustrates a flow diagram of an alternative data movement process.

In some embodiments to avoid calculating content ID at step 620 the content ID is stored with the physical data block on the storage medium 130. FIG. 7 illustrates a flow diagram for the data movement process with a stored content ID:

Step 710: The storage processor 110 reads the physical data block at PBN 230a;

Step 720: The storage processor 110 reads the CID 210 stored with the data block;

Step 730: The storage processor 110 looks up CID 210 in the second metadata table 154;

Step 740: The storage processor 110 writes the data block and CID 210 to the new physical location PBN 230b;

Step 750: The storage processor 110 maps CID 210 to PBN 230b in the second metadata table 154;

Step 760: The storage processor 110 marks PBN 230a free on the free block list.

It should be evident from the above flow diagrams that the data movement process is transparent to the user application 140. It should also be evident that only the second metadata table 154 is accessed as part of the data movement process. In some embodiments the second metadata table 154 is many times smaller than the first metadata table 152 and is stored entirely in the memory 120 for fast access.

The size of first metadata table 152 is proportional to the usable capacity of the storage system and can become very large due to deduplication, compression, and snapshots. Even with locality of reference caching can be a challenge for the first metadata table 152. The present disclosure provides methods to reduce the size of the first metadata table 152, thereby reducing its memory requirement and making caching more effective.

Figure 8:
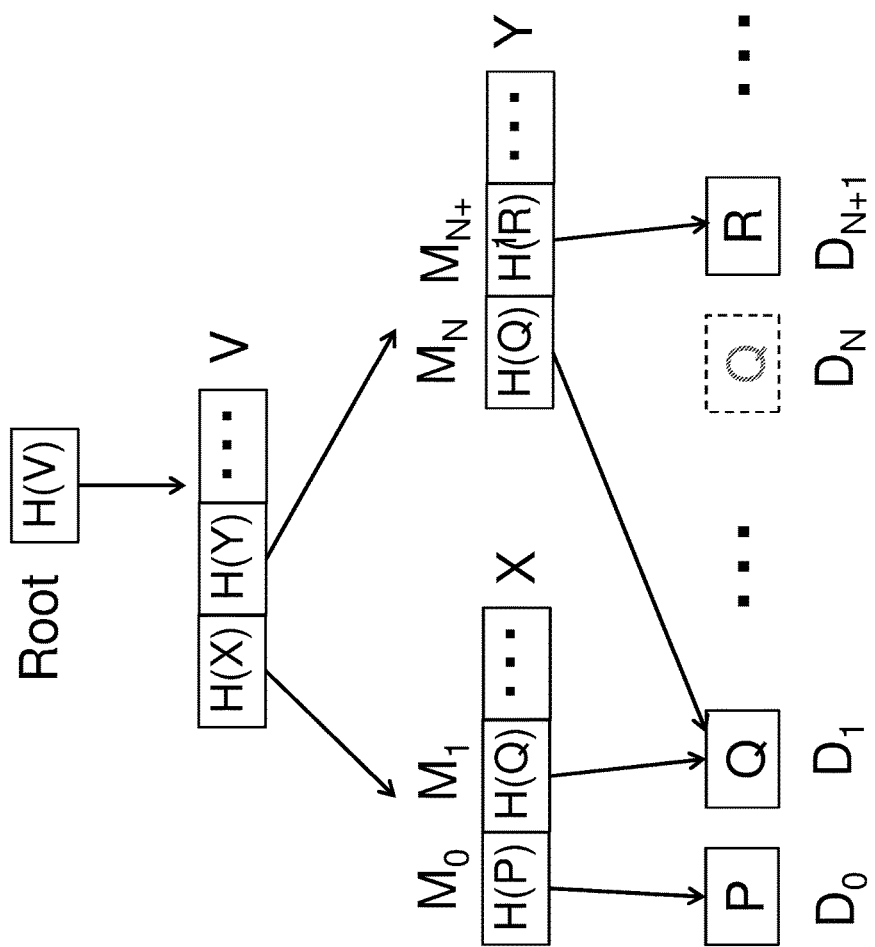
FIG. 8 illustrates a block diagram of the first metadata table in a tree data structure.
Figure 9:
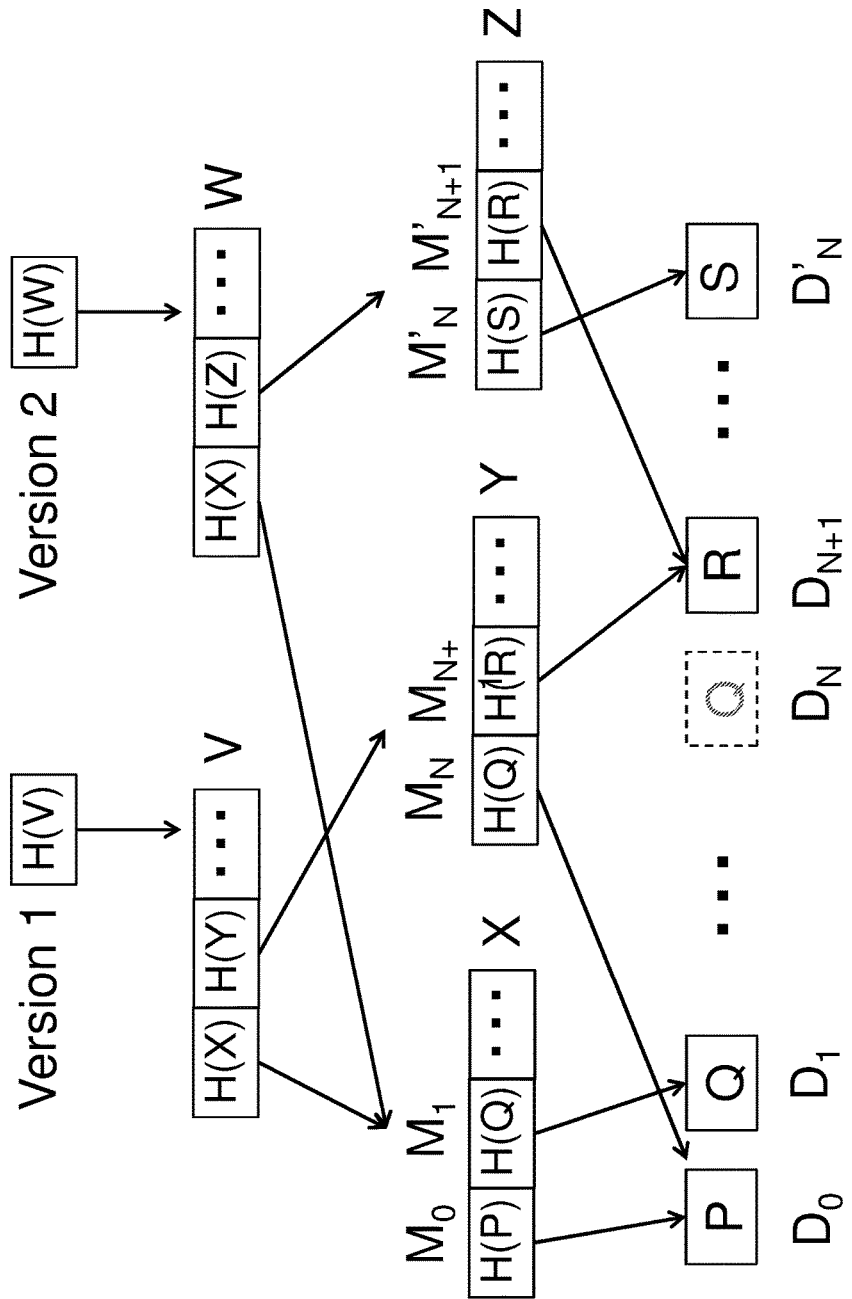
FIG. 9 illustrates a block diagram of metadata deduplication.

In some embodiments the first metadata table 152 is implemented in a tree data structure as illustrated in FIG. 8. At the bottom there is a linear sequence of data blocks $D_0$, $D_1$, $D_N$, $D_{N+1}$, . . . , corresponding to LBN 0, 1, . . . , N, N+1, . . . . Each data block's content (P, Q, R) is hashed and its content ID (H(P), H(Q), H(R)) stored in a metadata block. Each metadata block's content (X, Y) is also hashed and its content ID (H(X), H(Y)) stored in a metadata block. This process can be repeated recursively until a single content ID H(V) is obtained, which represents the root of the tree. In the case where data block $D_1$ and $D_N$ have the same content Q, both metadata $M_1$ and $M_N$ have the same content ID H(Q), resulting in data deduplication. LBN N for example is not stored in the metadata entry $M_N$ but can be easily determined based on $M_N$'s relative position in the tree. This not only greatly reduces the size of the first metadata table 152 but also makes its feasible to deduplicate metadata blocks. FIG. 9 illustrates that metadata blocks are deduplicated between two versions of the tree. The only difference from Version 1 to Version 2 is that the block content at LBN N is changed from Q to S. This change results in a new metadata entry $M'_N$, new metadata block Z, and new metadata block W, but the metadata block X is unchanged and shared between Version 1 and Version 2.

What is claimed is:

1. A storage system configured to support storage virtualization, data services, and data mobility, comprising:
a persistent storage medium; a memory;
a first metadata table comprising a plurality of entries, each of which maps a data block's LBN to its unique content ID;

a second metadata table comprising a plurality of entries, each of which maps a unique content ID to its PBN on the storage medium; and a storage processor configured to perform a data movement process, wherein as part of the data movement process, the storage controller is configured to:

read the data block from its current physical location PBN A; determine the unique content ID of the data block; look up the content ID in the second metadata table; write the data block to its new physical location PBN B; map the content ID to PBN B in the second metadata table; and mark PBN A free on free block list;

wherein the first metadata table entry only includes the data block's content ID but not its LBN; wherein the LBN can be a determined based on the metadata entry's relative position in the first metadata table.

2. The storage system of claim 1, wherein the storage processor determines the unique content ID by computing a strong hash of the block's contents.

3. The storage system of claim 1, wherein the storage processor determines the unique content ID by reading the content ID stored with the data block.

4. The storage system of claim 1, wherein the content ID is unique to the block's contents and data blocks are de-duplicated.

5. The storage system of claim 1, wherein the first metadata table is stored on the storage medium and cached in the memory based on locality of reference.

6. The storage system of claim 1, wherein the second metadata table is stored entirely in the memory.

7. The storage system of claim 1, wherein a plurality of entries in the first metadata table are stored in a metadata block, wherein a unique content ID is generated for each metadata block and metadata blocks are deduplicated.

8. A method implemented in a storage system to support a data movement process, said storage system comprising a persistent storage medium, a memory, a first metadata table comprising a plurality of entries, each of which maps a data block's LBN to its unique content ID, a second metadata table comprising a plurality of entries, each of which maps a unique content ID to its PBN on the storage medium, said method is characterized by:

reading the data block from its current physical location PBN A;
determining the unique content ID of the data block;
looking up the content ID in the second metadata table;
writing the data block to its new physical location PBN B; mapping the content ID to PBN B in the second metadata table; and marking PBN A free on free block list;
wherein the first metadata table entry only includes the data block's content ID but not its LBN; wherein the LBN can be a determined based on the metadata entry's relative position in the first metadata table.

9. The method of claim 8, wherein the determining of the unique content ID comprises computing a strong hash of the block's contents.

10. The method of claim 8, wherein the determining of the unique content ID comprises reading the content ID stored with the data block.

11. The method of claim 8, wherein the content ID is unique to the block's contents and data blocks are de-duplicated.

12. The method of claim 8, wherein the servicing of a read request comprises computing the content ID of the physical block and comparing it to the stored content ID in the metadata entry to make sure that the storage medium has returned the original data.

13. The method of claim 8, wherein the first metadata table is stored on the storage medium and cached in the memory based on locality of reference.

14. The method of claim 8, wherein the second metadata table is stored entirely in the memory.

15. The method of claim 8, wherein the first metadata table entry only includes the data block's content ID but not its LBN; wherein the LBN can be a determined based on the metadata entry's relative position in the first metadata table.

16. The method of claim 8, wherein a plurality of entries in the first metadata table are stored in a metadata block, wherein a unique content ID is generated for each metadata block and metadata blocks are deduplicated.

17. A storage system configured to support storage virtualization, data services, and data mobility, comprising:
a persistent storage medium;
a memory;
a first metadata table comprising a plurality of entries, each of which maps a data block's LBN to its unique content ID;
a second metadata table comprising a plurality of entries, each of which maps a unique content ID to its PBN on the storage medium; and
a storage processor configured to perform a data movement process, wherein as part of the data movement process, the storage controller is configured to:
read the data block from its current physical location PBN A;
determine the unique content ID of the data block;
look up the content ID in the second metadata table;
write the data block to its new physical location PBN B;
map the content ID to PBN B in the second metadata table; and
mark PBN A free on free block list;
wherein the storage processor is further configured to reduce the size of the first metadata table by:
storing only the content ID of a data block in the data block's entry in the first metadata table, wherein the data block's LBN is determined from the entry's relative position in the first metadata table; and
deduplicating metadata blocks, wherein a plurality of entries in the first metadata table that include only data blocks' content IDs are stored in a metadata block and wherein a unique content ID is generated for each metadata block and metadata blocks are deduplicated based on their unique content IDs.

* * * * *